Feb. 26, 1952 — R. W. ROUNDS — 2,587,386
CORN PLANTER
Filed March 5, 1947 — 4 Sheets-Sheet 1
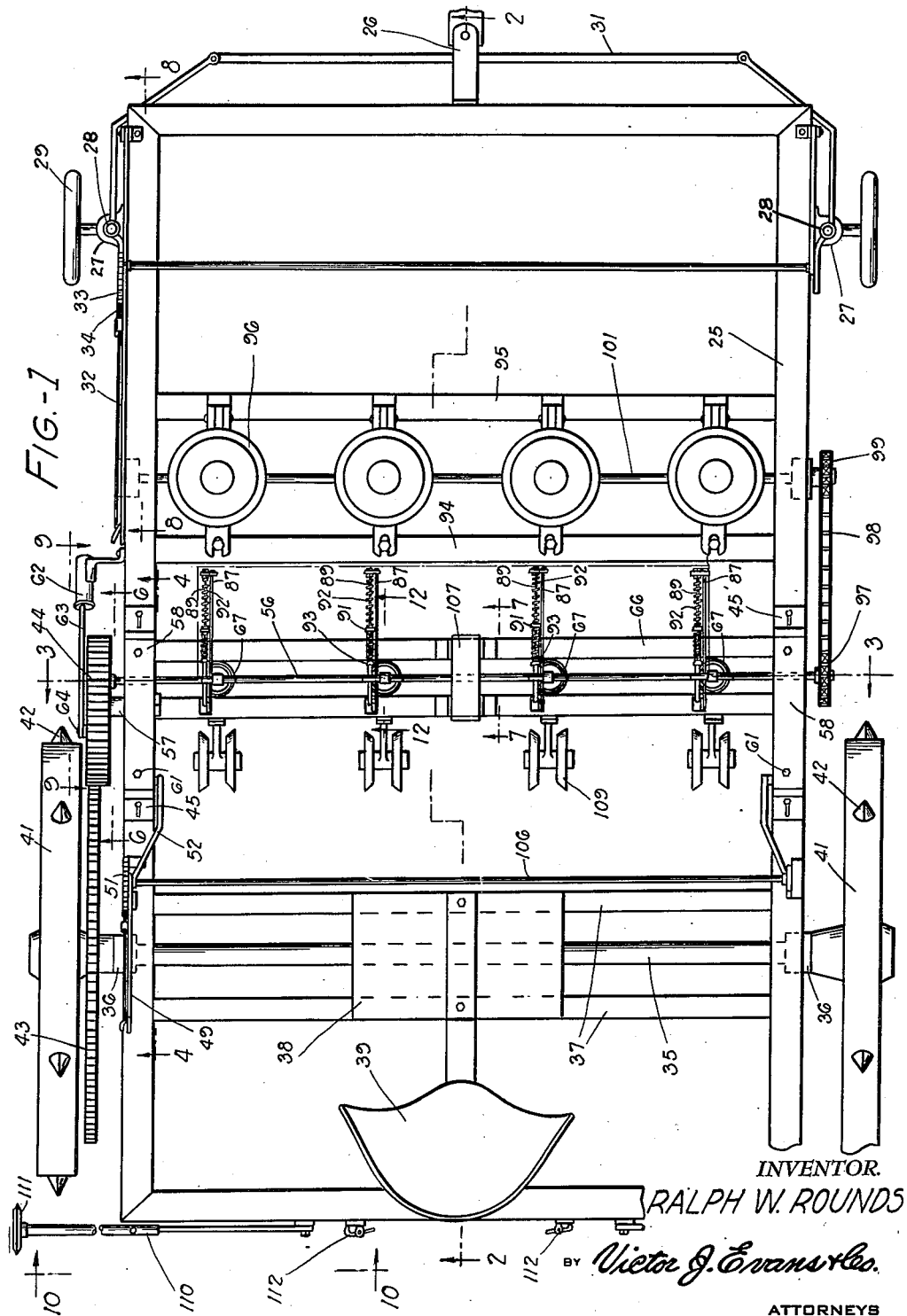
INVENTOR.
RALPH W. ROUNDS

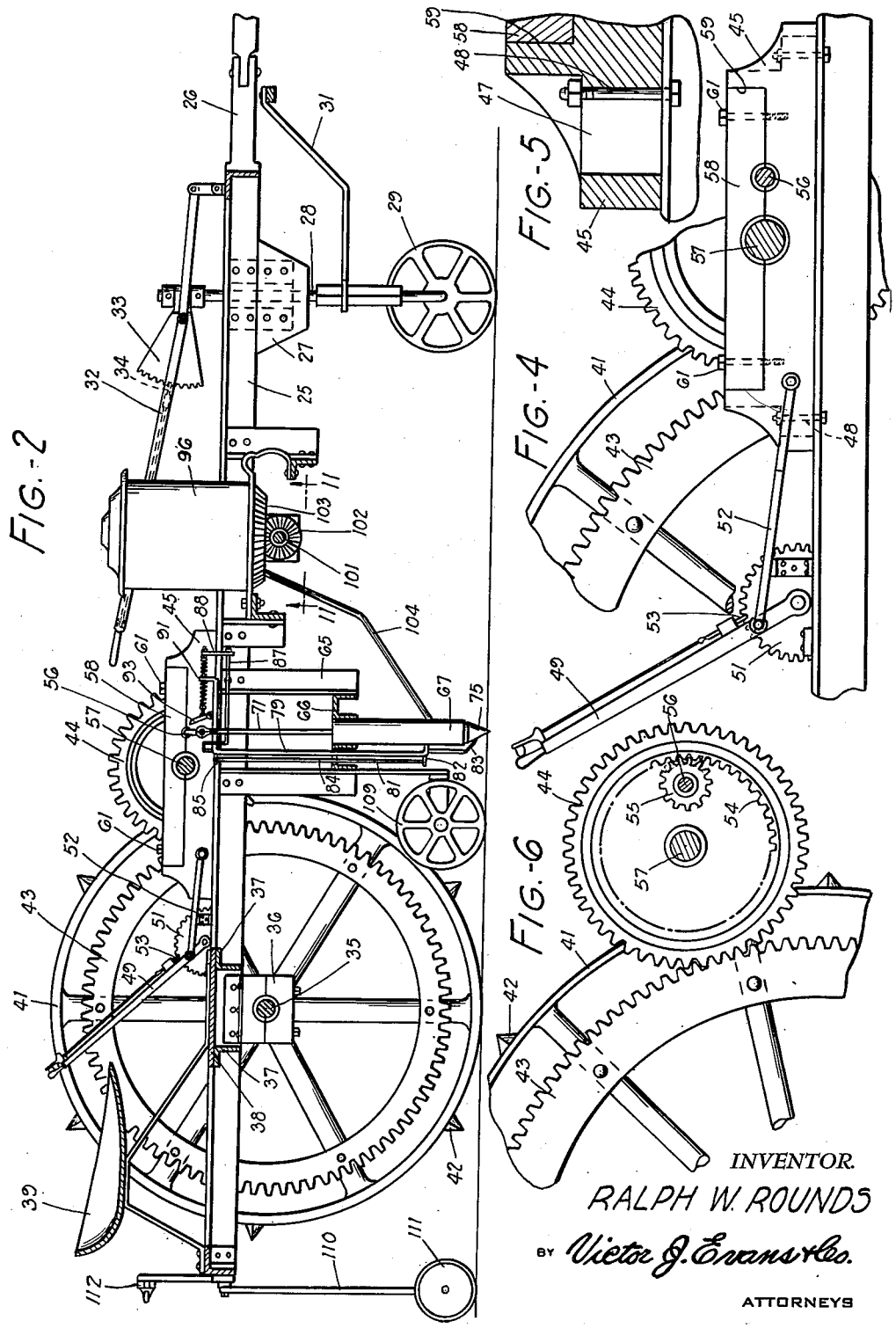

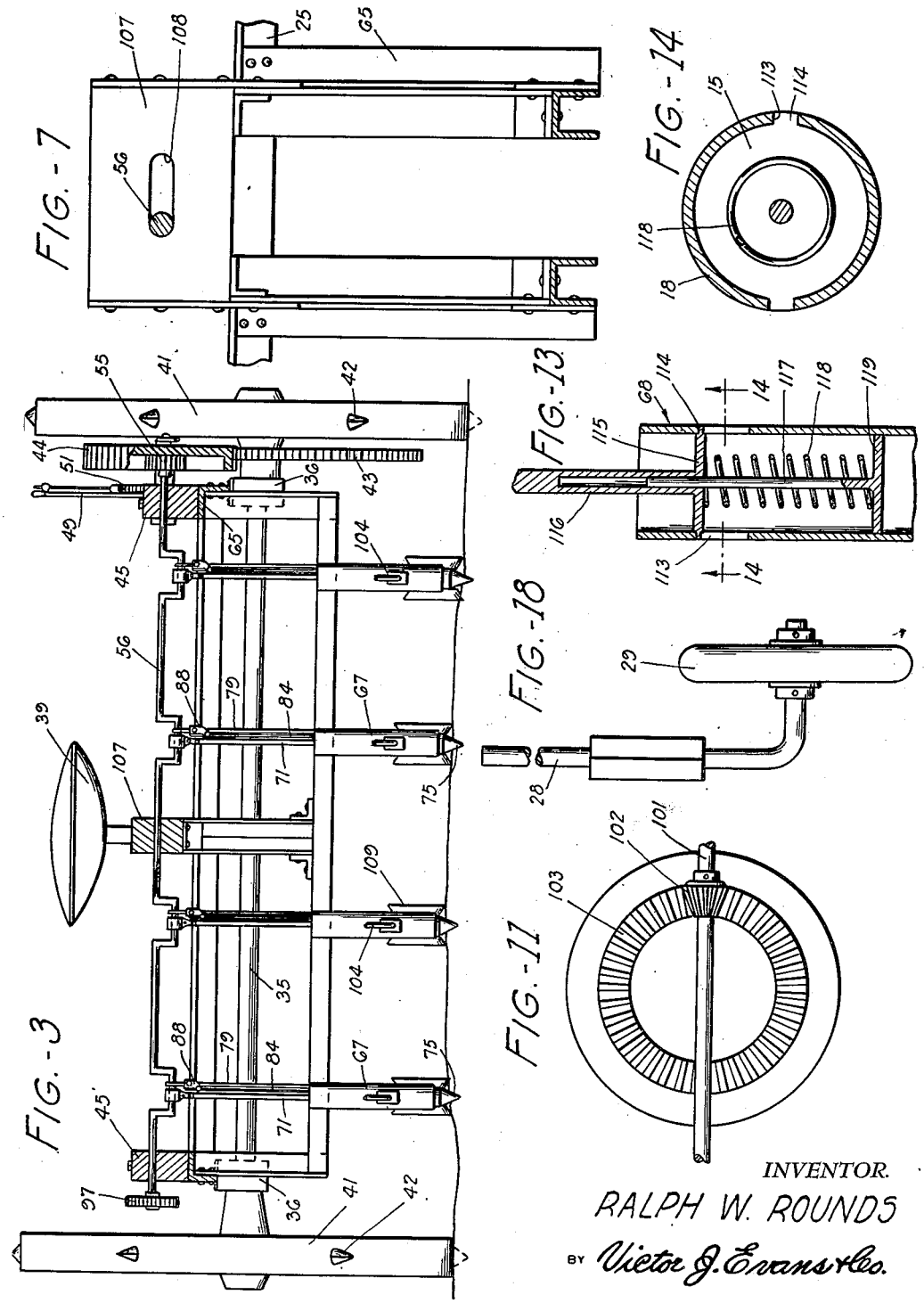

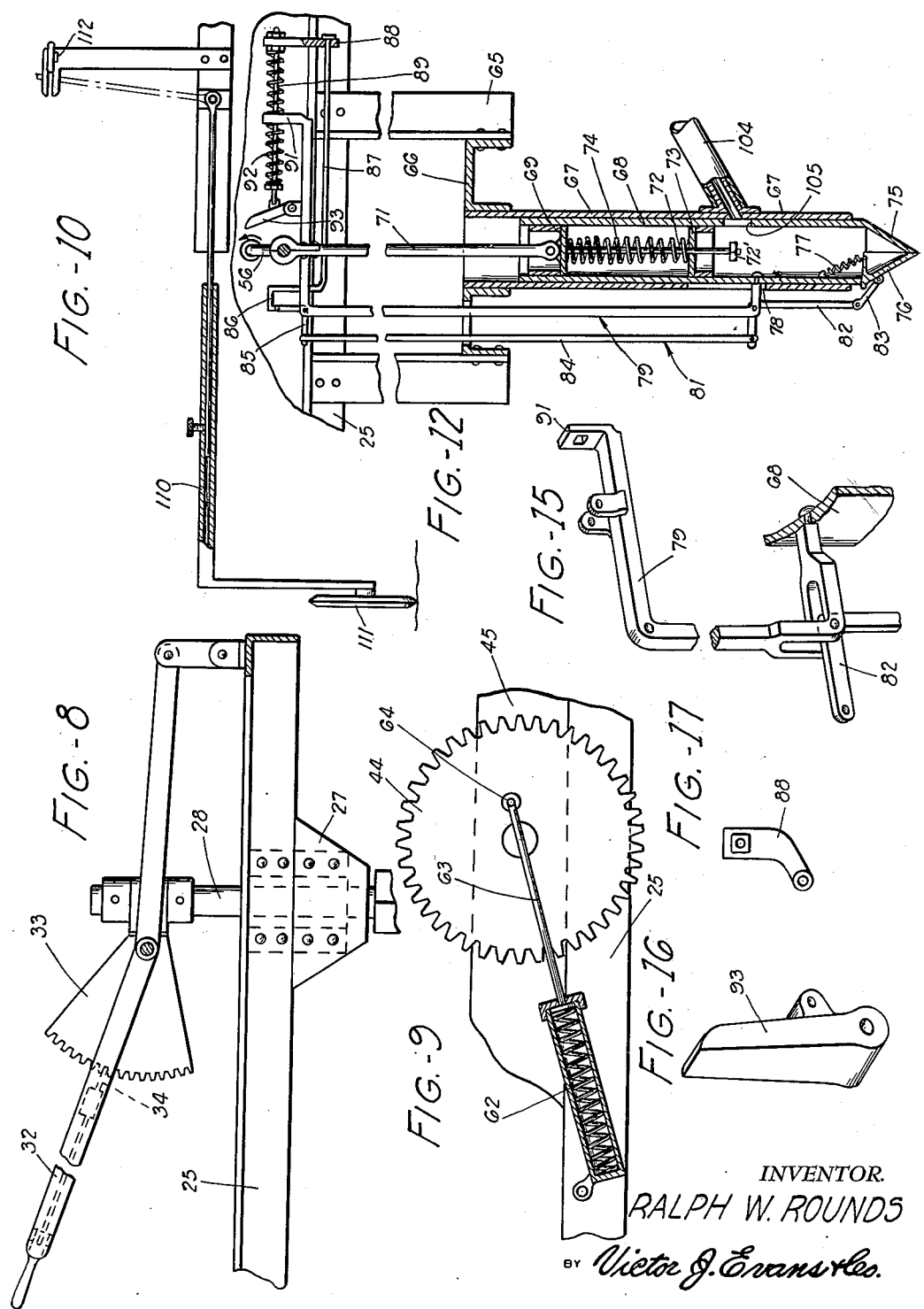

Patented Feb. 26, 1952

2,587,386

UNITED STATES PATENT OFFICE 2,587,386

CORN PLANTER

Ralph W. Rounds, Rawlins, Wyo.

Application March 5, 1947, Serial No. 732,576

5 Claims. (Cl. 111—89)

This invention relates to corn planters.

It is an object of the present invention to provide a wireless corn planter whereby the corn hills will be checked without the use of a wire and so that the corn can be cultivated by passing through the rows in any direction.

Other objects of the present invention are to provide a check row planter which is of simple construction, has minimum parts to get out of order, which has a simple mechanism for connecting and disconnecting the planting mechanism and which has a timing arrangement for cylindrical shoes which will trip just as the shoe is leaving the ground to deposit the seeds, and which is efficient in operation.

For still further objects and for a better understanding of the invention, reference may be had to the following detailed description taken in connection with the accompanying drawing, in which Fig. 1 is a top plan view of the planter embodying the features of the present invention, Fig. 2 is a longitudinal cross-sectional view of the planter taken on line 2—2 of Fig. 1 and looking in the direction of the arrows thereof, Fig. 3 is a transverse cross-sectional view of the planter taken substantially on the line 3—3 of Fig. 1 and looking in the direction of the arrows thereof, Fig. 4 is an enlarged fragmentary and sectional view taken on line 4—4 of Fig. 1 and looking in the direction of the arrows thereof and upon the driving gear connecting and disconnecting mechanism, Fig. 5 is an enlarged fragmentary and cross-sectional view taken through one end of the gear mechanism support to show its slotted connection with the frame of the planter, Fig. 6 is an enlarged fragmentary and cross-sectional view of the driving mechanism taken on line 6—6 of Fig. 1 and looking in the direction of the arrows thereof, Fig. 7 is an enlarged fragmentary view taken through the shoe supporting frame and on line 7—7 of Fig. 1 and looking in the direction of the arrows thereof, Fig. 8 is a fragmentary and cross-sectional view of the adjusting mechanism for the forward wheels by which the planting depth is controlled and as viewed on line 8—8 of Fig. 1 and looking in the direction of the arrows thereof, Fig. 9 is an enlarged fragmentary and cross-sectional view of the spring device viewed on line 9—9 of Fig. 1 and looking in the direction of the arrows thereof, Fig. 10 is a fragmentary and sectional view of one of the marker devices at the rear of the planter frame and as viewed on line 10—10 and looking in the direction of the arrows thereof, Fig. 11 is a bottom view looking upwardly upon the drive mechanism for one of the seed boxes and as viewed on line 11—11 of Fig. 2 and looking in the direction of the arrows thereof, Fig. 12 is an enlarged cross-sectional view taken through a seed shoe from which the group of seeds are finally deposited in the ground and as viewed on line 12—12 of Fig. 1 and looking in the direction of the arrows thereof, Fig. 13 is a fragmentary and modified form of cylindrical shoe construction wherein the pressure spring is differently arranged within the cylinder, Fig. 14 is an enlarged transverse view taken through the modified shoe arrangement and on line 14—14 of Fig. 13 and looking in the direction of the arrows thereof, Fig. 15 is a fragmentary and perspective view of parts of the operating linkage for supporting the bottom end of the shoe to drop the seed, Fig. 16 is a detail perspective view of a trip lever used in the operating seed valve linkage, Fig. 17 is an end view of a plate which forms a part of the operating linkage for the seed valve, Fig. 18 is a front elevational view of one of the forward supporting wheels.

Referring now to the figures, 25 represents a main supporting frame. To the forward end of this frame there is connected a draft member 26 by which the frame can be connected to a tractor or horse device for pulling the same. To the forward end of the frame 25 and at opposite sides thereof there are connected brackets 27 to which steerable wheel shafts 28 are connected with supporting wheels 29. These steerable shafts 28 are tied together through linkage 31. The wheel shafts, as can be clearly seen from Fig. 8, can be adjusted through the brackets 27 so as to alter the height of the forward end of the frame above the ground and hence the distance to which the planting shoes will pierce the ground and thus vary the planting depth of the corn. This effect will be more apparent as the description proceeds. The adjustment however is effected by a hand lever 32 acting over a quadrant 33 and provided with a detent 34 for engaging the quadrant teeth.

Extending across the rear of the frame 25 is a rear wheel axle 35 supported in bearing blocks 36 depending from the sides of the frame. Above these bearing blocks and extending across the frame are transverse members 37 on which is a plate 38 from which there extends upwardly an operator's seat 39. The plate 38 is positioned so that the operator's feet can be disposed upon it. On the opposite ends of the wheel axle are large wheels 41 having lugs 42 thereon to prevent the slippage of the wheels. A large gear 43 is driven by the wheel at the left side of the frame and this in turn drives a gear 44 which is mounted upon a slide 45 so that by movement of the slide the gear 44 can be moved out of engagement with the large gear 43 to stop the planting operation. The slide 45 has elongated openings 47 therein through which extend bolts 48, Figs. 4 and 5, which retain the slide 45 in place on the frame and limit the amount of sliding movement of the same. The adjustment of the slide 45 is effected by means of a lever 49 adapted to act over a quadrant 51 and connected to a slide by a link 52. A detent 53 on the lever fixes the lever to its adjusted position on the quadrant 51. This gear 44 has internal teeth 54 for driving pinion 55 on a crank shaft 56 which extends through the slide to be movable therewith.

The gear 44 is connected to the slide by a shaft 57 and this shaft and the crank shaft 56 are detachably retained in place on the slide 45 by a removable piece 58 secured within a top recess 59 of the slide by bolts 61. This permits the easy replacement of driving gears or the change of driving gears to alter the timing of the planting devices and the distances between corn hills. In order to return the gear 44 to a definite starting position, for a purpose to appear, upon disengagement between gears 43 and 44, there is provided on the side of the frame a spring device 62, as shown in Fig. 9, which has its rod 63 connected to a crank pin 64 on the side face of the gear 44.

Below the crank shaft 56 and connected to the frame is a depending structure 65, as more clearly shown in Fig. 12, which carries in its lower end a transverse member 66 into which there is extended and fixed at spaced locations therealong, vertically extending external sleeves 67 in which are slidable cylindrical shoes 68. Within each of the cylindrical shoes or seed cylinders is a plunger 69 connected by means of a connecting rod 71 with a crank on the crank shaft 56. This plunger has a depending spring guide 72 which extends through a plate 73, fixed to the sidewall of the cylinder 68, and terminates in a nut 72'. A spring 74 extends between the plunger and the plate 73. The bottom end of the cylinder is pointed as shown at 75 to pierce the ground. By having the spring 74 the cylinder 68 is cushioned in its movement into the ground. This arrangement will give some lost motion and prevent breakage of the shoe. On the lower end of the cylinder 68 is a valve 76 which is opened at the proper time to drop the seeds in the hole formed by the pointed end 75 of the seed cylinder 68. This valve is normally retained closed by a spring 77.

Fixed to the cylinder 68 and extending through an opening 78 in the external sleeve 67 is a bracket 79 for supporting a valve operating linkage 81, as also shown in Figs. 12 and 15. Since the bracket 79 is connected to the cylinder 68 which moves up and down the operating linkage 81 for the valve 76 will accordingly move up and down with the cylinder 68. The operating linkage 81 includes a bell crank 82 connected at one end by a link 83 to the valve 76 and at the other end by a long link 84 which is connected at its upper end to a bell crank 85 pivoted upon the upper end of the bracket 79 and connected to a bent portion 86 fixed to one end of a rod 87 which is connected at its free end to a plate 88, Fig. 17, fixed to a spring rod 89 slidable in an upstanding portion 91 of the bracket 79. On this rod 89 and at opposite sides of the upstanding portion 91 are balanced springs 92. Also on the bracket 79 there is pivoted a trip element 93 connected to the rod 89 and adapted to be struck by the crank shaft at a time when the cylindrical shoe 68 is leaving the ground so as to deposit the seed at that time in the ground.

On transverse members 94 and 95 there are mounted seed containers 96 having the usual seed plates adapted to be rotated with openings adapted to receive the correct number of seeds to be planted in a single hill. On the end of the crank shaft 56 at the right side of the frame there is a sprocket 97 which is connected by a chain 98 to a sprocket 99 on a shaft 101 extending beneath the seed containers 96 and, as shown in Fig. 11, having bevel pinions 102 on the same adapted to engage with the bevel gears 103 which drive the seed plates within the seed containers. Extending downwardly from the containers are flexible seed chutes 104 which connect with the external sleeve 67, Fig. 12, to deposit the seed within the seed cylinder 68 when its opening 105 therein is aligned with the seed chute 104.

There is located at the right side of the frame, a slide 45' corresponding to the slide 45 and this slide is operated in unison with the slide 45 as there is a connection 106 extending across frame to operate the slide 45'. Intermediate the length of the shaft 56 is a support 107 having an elongated hole 108 therein, Fig. 7, to limit the fore and aft adjustment of the shaft 56. Depending from the structure 65 and disposed respectively in rear of the cylindrical shoes 68 are covering wheels 109.

On the rear of the frame 25 are marker devices 110 formed of telescopic parts so that marker wheel 111 can be disposed at different distances outwardly of the frame, so as to provide a mark for different width rows. The marker devices 110 when not in use can be raised and retained in the raised position by a latch 112, Fig. 10.

Referring now to Figs. 13 and 14, there is shown a modified form of spring arrangement within the cylinder 68. The cylinder 68 can be provided with slots 113 into which projections 114 of a plunger 115 may extend. Extending upwardly into the plunger 115 and into rod 116 is a spring guide stem 117. About the stem 117 is a spring 118 which reacts against the plunger 115 to force the sleeve 68 into the ground. The stem 117 extends from a transverse plate 119 fixed to the sleeve 68.

The spring device 62 acting upon the gear 44 will, when the gear 44 is moved out of engagement with the large gear 43, return the planting mechanism to the start of its cycle so that when the gear 44 re-engages the gear 43, the planting mechanism will be in a position to plant immediately the first hills of corn and as often thereafter as the timing gears 54 and 55 demand. In addition, the spring device 62 will function as a counterbalance to assist the crank shaft 56 in raising the seed cylinders 68.

In operation, the crankshaft 56 is driven by the large gear 43 through the intermediate gears 44 and 55 (Figs. 6). Each crank of the crank shaft 56, through a connecting rod 71 and spring 74, will cause reciprocation of a cylinder 68.

Upon downward movement of a cylinder 68, the pointed end 75 pierces the ground. Upon upward movement of the cylinder 68, the pointed end 75 is withdrawn from the ground and a bracket 79 is simultaneously raised by the cylinder to place a trip element 93 in a position to be actuated by the crank of the crank shaft 56. The trip element 93 is struck by the crank causing the valve 76 to open simultaneous with the withdrawal of the pointed end 75 from the ground to deposit the seed.

Having now described my invention, I claim:

1. A corn planter comprising a main frame, front wheels on and supporting the front of the frame, rear wheels on and supporting the rear of the frame, a driving gear driven by one of the wheels, a multiple crank shaft journalled on the frame and extending transversely thereof, means transmitting drive from said driving gear to the crank shaft to rotate the same, a structure below the crank shaft depending from said frame, a sleeve supported substantially vertically by the depending structure beneath each of the cranks of the crank shaft, a cylindrical shoe reciprocably mounted in each sleeve, connecting rod means between each cylindrical shoe and associated crank to effect the lowering and raising of the cylindrical shoe, a seed valve on the lower end of each cylindrical shoe, a trip mechanism carried by each shoe and adapted to be operated by the associated crank a certain time for opening the associated sleeve valve to discharge the seed, seed containers disposed on the frame ahead of the cylindrical shoes having operating gears, a chute extending therefrom to the depending sleeves for delivering seeds to the cylindrical shoes, and driving mechanism extending between the crank shaft and the operating gears of the seed containers to operate the same.

2. A corn planter as defined in claim 1, and a bracket connected to each cylindrical shoe reciprocable therewith, and each said trip mechanism comprising linkage mounted upon the bracket so as to be movable vertically therewith to position the same periodically for engagement by the associated crank.

3. A corn planter as defined in claim 1, and a plunger within the cylindrical shoes connected to the connecting rod extending from the crank shaft, a spring guide extending from the plunger, a spring surrounding the spring guide and reacting against the plunger, and an internal plate fixed to the internal wall of the cylindrical shoe, with which the spring abuts to force the cylindrical shoe into the ground.

4. A corn planter as defined in claim 1, and slides at opposite sides of the frame, said crank shaft being mounted in said slides, and said driving mechanism between the crank shaft and the wheel gear comprising a large gear mounted on one of the slides, manually adjustable mechanism for moving the slides whereby to connect or disconnect the gear with the wheel gear so as to start or stop the operation of the planter device.

5. In a corn planter, the combination of a main supporting frame adapted to be attached to a pulling means, a driving gear rotatably mounted on said main supporting frame, bearing means slidably mounted on said main supporting frame, gearing on said bearing means, manual means for sliding said bearing means on said frame whereby said gearing is caused to engage or disengage said driving gear, a crank shaft rotatably supported by said bearing means and connected to said gearing, a structure underneath said crank shaft depending from said main supporting frame, a sleeve depending from said structure, a hollow seed cylinder slidably mounted in said external sleeve, means yieldably connecting said seed cylinder with a crank of said crank shaft, a hollow conical portion terminating said hollow seed cylinder, a valve portion pivoted on said hollow seed cylinder and complemental to said conical portion to form a conical end adapted to pierce the ground, a bracket fixed to said seed cylinder for reciprocable movement therewith, said bracket extending upward toward the crank of said crank shaft, an operating linkage supported by said bracket and connected to said valve portion for operating the same, a trip element pivoted on said bracket in the plane of rotation of the crank of said crank shaft, and a rod connecting said trip element with said operating linkage, whereby said trip element is raised by said bracket into the path of the crank of said crank shaft for actuation thereby to operate said operating linkage.

RALPH W. ROUNDS.

REFERENCES CITED

The following references are of record in the file of this patent:

UNITED STATES PATENTS

| Number | Name | Date |
|---|---|---|
| 69,739 | Abbott | Oct. 15, 1867 |
| 156,545 | Davis | Nov. 3, 1874 |
| 352,186 | Henderson | Nov. 9, 1886 |
| 357,003 | Henderson | Feb. 1, 1887 |
| 1,396,784 | Samuels et al. | Nov. 15, 1921 |
| 1,447,097 | Anderson et al. | Dec. 11, 1923 |

FOREIGN PATENTS

| Number | Country | Date |
|---|---|---|
| 11,638 | Great Britain | Mar. 23, 1847 |
| 225,763 | Germany | Sept. 23, 1910 |
| 387,160 | Germany | Dec. 27, 1923 |
| 393,101 | Germany | Apr. 3, 1924 |
| 530,075 | France | Sept. 23, 1921 |